United States Patent
Janjua et al.

(10) Patent No.: US 10,916,262 B1
(45) Date of Patent: Feb. 9, 2021

(54) NEAR FIELD TRANSDUCERS INCLUDING COPPER BASED ALLOYS

(71) Applicant: Seagate Technology LLC, Cupertino, CA (US)

(72) Inventors: Muhammed Bilal Janjua, Belfast (GB); Martin Peter McCurry, Londonderry (GB); Michael James Hardy, Londonderry (GB); Mark Anthony Gubbins, Letterkenny (IE)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 16/725,746

(22) Filed: Dec. 23, 2019

(51) Int. Cl.
*G11B 5/31* (2006.01)
*C22C 9/00* (2006.01)
*G11B 5/00* (2006.01)

(52) U.S. Cl.
CPC .............. *G11B 5/314* (2013.01); *C22C 9/00* (2013.01); *G11B 2005/0021* (2013.01)

(58) Field of Classification Search
CPC ...................................................... G11B 5/31
USPC .................... 360/125–125.5, 125.31–125.35
See application file for complete search history.

(56) References Cited

U.S. PATENT DOCUMENTS

| | | | |
|---|---|---|---|
| 7,521,137 B2 | 4/2009 | Hohlfeld et al. | |
| 7,862,914 B2 | 1/2011 | Kubota et al. | |
| 8,462,593 B1* | 6/2013 | Komura | G11B 5/314 369/13.13 |
| 8,941,950 B2 | 1/2015 | Yuan et al. | |
| 9,263,076 B1 | 2/2016 | Peng et al. | |
| 2010/0110577 A1 | 5/2010 | Weller et al. | |
| 2010/0208378 A1* | 8/2010 | Seigler | B82Y 10/00 360/59 |
| 2011/0026379 A1* | 2/2011 | Shimazawa | G11B 5/314 369/13.33 |
| 2011/0038236 A1* | 2/2011 | Mizuno | G11B 5/314 369/13.24 |
| 2012/0251842 A1 | 10/2012 | Yuan et al. | |
| 2013/0286799 A1* | 10/2013 | Zhu | G11B 13/08 369/13.02 |

(Continued)

FOREIGN PATENT DOCUMENTS

CN    102737652    10/2012

OTHER PUBLICATIONS

Inoue et al., "Formation, Thermal Stability and Mechanical Properties of Cu—Zr and Cu—Hf Binary Glassy Alloy Rods", Materials Transactions, vol. 45, No. 2, 2004, pp. 584-587.

(Continued)

*Primary Examiner* — Allen T Cao
(74) *Attorney, Agent, or Firm* — Mueting Raasch Group

(57) ABSTRACT

A device including a near field transducer, the near field transducer including a near field transducer, the near field transducer comprising a copper (Cu) alloy of the formula $Cu_{1-z}X_z$, where z ranges from 0.001 to 0.9 and X is selected from aluminum (Al), cobalt (Co), chromium (Cr), erbium (Er), iron (Fe), gold (Au), hafnium (Hf), iridium (Ir), molybdenum (Mo), nickel (Ni), palladium (Pd), platinum (Pt), rhenium (Re), rhodium (Rh), ruthenium (Ru), silicon (Si), tin (Sn), tantalum (Ta), tellurium (Te), titanium (Ti), tungsten (W), yttrium (Y), zinc (Zn), zirconium (Zr), or combinations thereof.

18 Claims, 5 Drawing Sheets

(56) References Cited

U.S. PATENT DOCUMENTS

2015/0179204 A1 6/2015 Mosendz et al.

OTHER PUBLICATIONS

Kao et al., "Simulation of reduced glass transition temperature of Cu—Zr alloys by molecular dynamics", Journal of Applied Physics 105, 064913, 2009.
Kassner et al., "Creep in amorphous metals", J Mater Res Technol. 2015, 4(1), pp. 100-107.
Li et al., "Oxidation and protection in copper and copper alloy thin films", Journal of Applied Physics, vol. 70, Issue 5, 1991.
Maliutina et al., "Structure and Microhardness of Cu—Ta Joints Produced by Explosive Welding", The Scientific World Journal, vol. 2013, Article 256758, 7 pages.
Roy et al., "Grain size stability and hardnessin nanocrystalline Cu—Al—Zr and Cu—Al—Y Alloys", Materials Science and Engineering, vol. 598, Mar. 26, 2014, pp. 217-223.
Tam et al., "Oxidation Behaviour of Cu Zr Ti Bulk Metallic Glass", Journal of Materials Research, Vo. 20, Issue 6, Jun. 2005, pp. 1396-1403.

\* cited by examiner

NEAR FIELD TRANSDUCERS INCLUDING COPPER BASED ALLOYS

SUMMARY

A device including a near field transducer, the near field transducer including copper (Cu) alloys of the formula $Cu_{1-z}X_z$, where z ranges from 0.001 to 0.9 and X is selected from aluminum (Al), cobalt (Co), chromium (Cr), erbium (Er), iron (Fe), gold (Au), hafnium (Hf), iridium (Ir), molybdenum (Mo), nickel (Ni), palladium (Pd), platinum (Pt), rhenium (Re), rhodium (Rh), ruthenium (Ru), silicon (Si), tin (Sn), tantalum (Ta), tellurium (Te), titanium (Ti), tungsten (W), yttrium (Y), zinc (Zn), zirconium (Zr), or combinations thereof.

A device including a light source; a waveguide; and a near field transducer, the near field transducer including copper (Cu) alloys of the formula $Cu_{1-z}X_z$, where z ranges from 0.001 to 0.9 and X is selected from aluminum (Al), cobalt (Co), chromium (Cr), erbium (Er), iron (Fe), gold (Au), hafnium (Hf), iridium (Ir), molybdenum (Mo), nickel (Ni), palladium (Pd), platinum (Pt), rhenium (Re), rhodium (Rh), ruthenium (Ru), silicon (Si), tin (Sn), tantalum (Ta), tellurium (Te), titanium (Ti), tungsten (W), yttrium (Y), zinc (Zn), zirconium (Zr), or combinations thereof, wherein the light source, waveguide and near field transducer are configured to transmit light from the light source to the waveguide and finally the near field transducer.

A system including a light source; a near field transducer, the near field transducer including copper (Cu) alloys of the formula $Cu_{1-z}X_z$, where z ranges from 0.001 to 0.9 and X is selected from aluminum (Al), cobalt (Co), chromium (Cr), erbium (Er), iron (Fe), gold (Au), hafnium (Hf), iridium (Ir), molybdenum (Mo), nickel (Ni), palladium (Pd), platinum (Pt), rhenium (Re), rhodium (Rh), ruthenium (Ru), silicon (Si), tin (Sn), tantalum (Ta), tellurium (Te), titanium (Ti), tungsten (W), yttrium (Y), zinc (Zn), zirconium (Zr), or combinations thereof; a magnetic reader; and a magnetic writer wherein the light source and the near field transducer are configured to transmit light from the light source to the near field transducer in order to assist the magnetic writer with writing.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE FIGURES

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Heat assisted magnetic recording (referred to through as HAMR) utilizes radiation, for example from a laser, to heat media to a temperature above its curie temperature, enabling magnetic recording. In order to deliver the radiation, e.g., a laser beam, to a small area (on the order of 20 to 50 nm for example) of the medium, a NFT is utilized. During a magnetic recording operation, the NFT absorbs energy from a laser and focuses it to a very small area; this can cause the temperature of the NFT to increase. The temperature of the NFT can be elevated up to about 400° C. or more.

The very high temperatures that the NFT reaches during operation can lead to diffusion of the material of the NFT (for example gold) from the peg and towards the disk. In addition, a portion of the NFT may be exposed at the air bearing surface of the recording head and is thus subject to mechanical wearing. NFT performance is greatly influenced by the heat and mechanical stress during HAMR operation. It would therefore be advantageous to have NFT devices that are more durable.

Disclosed devices can offer the advantage of providing more efficient transfer of energy from an energy source to the magnetic storage media to be heated, a smaller focal point at the point of heating, or some combination thereof. In some embodiments, disclosed devices can be used within other devices or systems, such as magnetic recording heads, more specifically, thermally or heat assisted magnetic recording (HAMR) heads, or disc drives that include such devices.

For heat assisted magnetic recording (HAMR), electromagnetic radiation, for example, visible, infrared or ultraviolet light is directed onto a surface of the data storage media to raise the temperature of a localized area of the media to facilitate switching of the magnetization of the area. Recent designs of HAMR recording heads include a thin film waveguide on a slider to guide light toward the storage media and a near field transducer to focus the light to a spot size smaller than the diffraction limit. Disclosed NFTs can be utilized in disc drives or in other devices that include a near field transducer.

Figure 1:
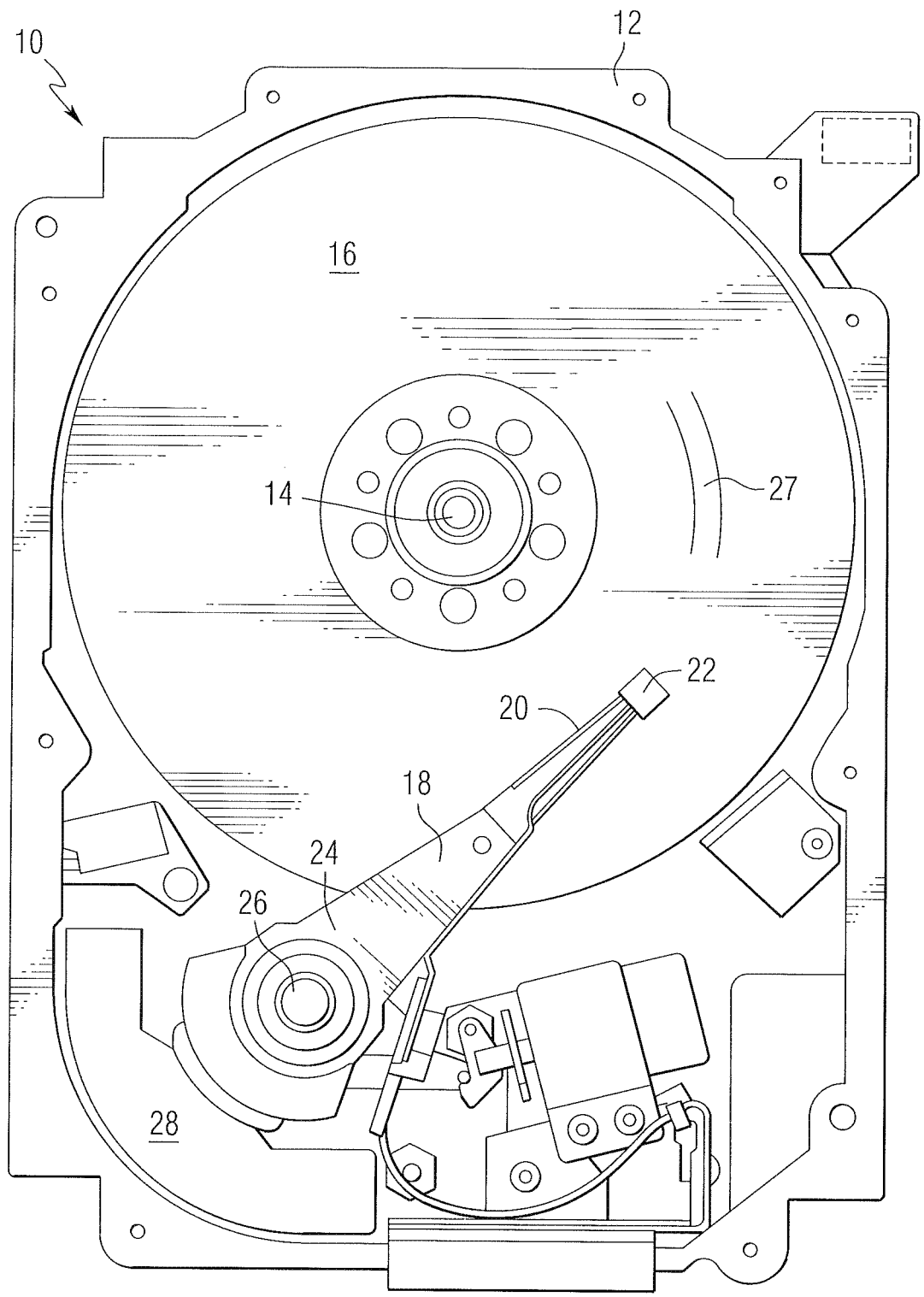
FIG. 1 is a pictorial representation of a data storage device in the form of a disc drive that can include a recording head constructed in accordance with an aspect of this disclosure.
Figure 2:
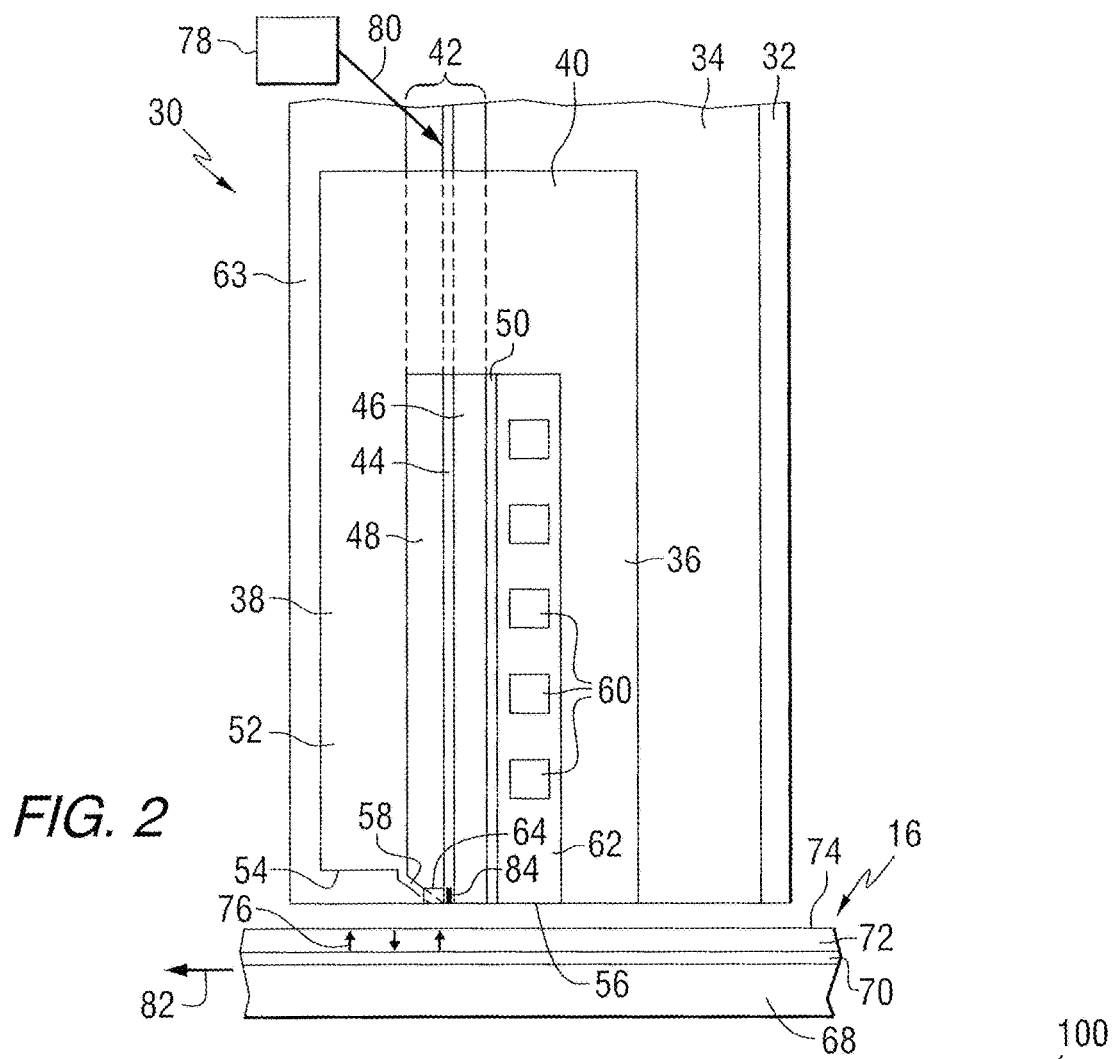
FIG. 2 is a side elevation view of a recording head constructed in accordance with an aspect of the invention.

FIG. 2 is a side elevation view of a recording head that may include a disclosed NFT; the recording head is positioned near a storage media. The recording head 30 includes a substrate 32, a base coat 34 on the substrate, a bottom pole 36 on the base coat, and a top pole 38 that is magnetically coupled to the bottom pole through a yoke or pedestal 40. A waveguide 42 is positioned between the top and bottom poles. The waveguide includes a core layer 44 and cladding layers 46 and 48 on opposite sides of the core layer. A mirror 50 is positioned adjacent to one of the cladding layers. The top pole is a two-piece pole that includes a first portion, or pole body 52, having a first end 54 that is spaced from the air bearing surface 56, and a second portion, or sloped pole piece 58, extending from the first portion and tilted in a direction toward the bottom pole. The second portion is structured to include an end adjacent to the air bearing surface 56 of the recording head, with the end being closer to the waveguide than the first portion of the top pole. A planar coil 60 also extends between the top and bottom poles and around the pedestal. In this example, the top pole serves as a write pole and the bottom pole serves as a return pole.

An insulating material 62 separates the coil turns. In one example, the substrate can be AlTiC, the core layer can be $Ta_2O_5$, and the cladding layers (and other insulating layers) can be $Al_2O_3$. A top layer of insulating material 63 can be formed on the top pole. A heat sink 64 is positioned adjacent to the sloped pole piece 58. The heat sink can be comprised of a non-magnetic material, such as for example Au.

As illustrated in FIG. 2, the recording head 30 includes a structure for heating the magnetic storage media 16 proximate to where the write pole 58 applies the magnetic write field H to the storage media 16. In this example, the media 16 includes a substrate 68, a heat sink layer 70, a magnetic recording layer 72, and a protective layer 74. However, other types of media, such as bit patterned media can be used. A magnetic field H produced by current in the coil 60 is used to control the direction of magnetization of bits 76 in the recording layer of the media.

The storage media 16 is positioned adjacent to or under the recording head 30. The waveguide 42 conducts light from a source 78 of electromagnetic radiation, which may be, for example, ultraviolet, infrared, or visible light. The source may be, for example, a laser diode, or other suitable laser light source for directing a light beam 80 toward the waveguide 42. Specific exemplary types of light sources 78 can include, for example laser diodes, light emitting diodes (LEDs), edge emitting laser diodes (EELs), vertical cavity surface emitting lasers (VCSELs), and surface emitting diodes. In some embodiments, the light source can produce energy having a wavelength of 830 nm, for example. Various techniques that are known for coupling the light beam 80 into the waveguide 42 may be used. Once the light beam 80 is coupled into the waveguide 42, the light propagates through the waveguide 42 toward a truncated end of the waveguide 42 that is formed adjacent the air bearing surface (ABS) of the recording head 30. Light exits the end of the waveguide and heats a portion of the media, as the media moves relative to the recording head as shown by arrow 82. A near-field transducer (NFT) 84 is positioned in or adjacent to the waveguide and at or near the air bearing surface. The heat sink material may be chosen such that it does not interfere with the resonance of the NFT.

Although the example of FIG. 2 shows a perpendicular magnetic recording head and a perpendicular magnetic storage media, it will be appreciated that the disclosure may also be used in conjunction with other types of recording heads and/or storage media where it may be desirable to concentrate light to a small spot.

Figure 3:
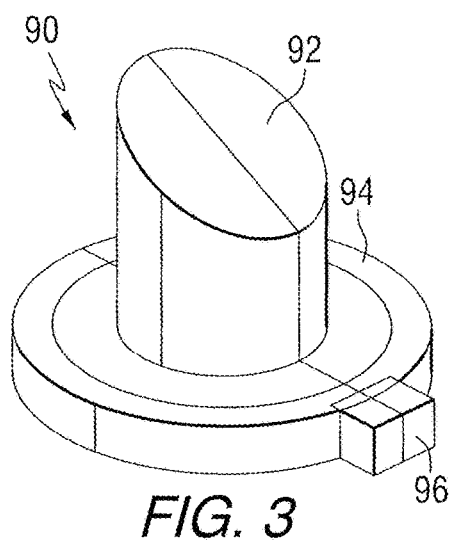
FIG. 3 is a schematic representation of a near field transducer.

FIG. 3 is a schematic view of a lollypop NFT 90 in combination with a heat sink 92. The NFT includes a disk shaped portion 94 and a peg 96 extending from the disk shaped portion. The heat sink 92 can be positioned between the disk shaped portion and the sloped portion of the top pole in FIG. 2. When mounted in a recording head, the peg may be exposed at the ABS and thus can be subjected to mechanical wearing.

Figure 4:
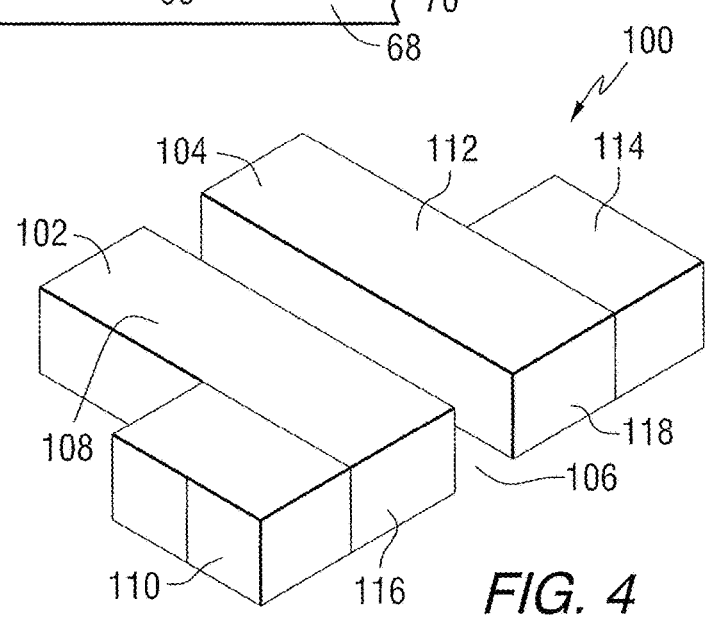
FIG. 4 is a schematic representation of another near field transducer.

FIG. 4 is a schematic view of a coupled nanorod (CNR) NFT 100. This NFT includes two nanorods 102 and 104 separated by a gap 106. Nanorod 102 includes a first portion 108 and a second portion 110. Nanorod 104 includes a first portion 112 and a second portion 114. When mounted in a recording head, the ends 116 and 118 of the nanorods may be exposed at the ABS and thus be subject to mechanical wearing. FIGS. 3 and 4 show example NFTs. However, the disclosure is not limited to any particular type of NFT. The materials described below may be used in various NFT configurations.

Figure 5:
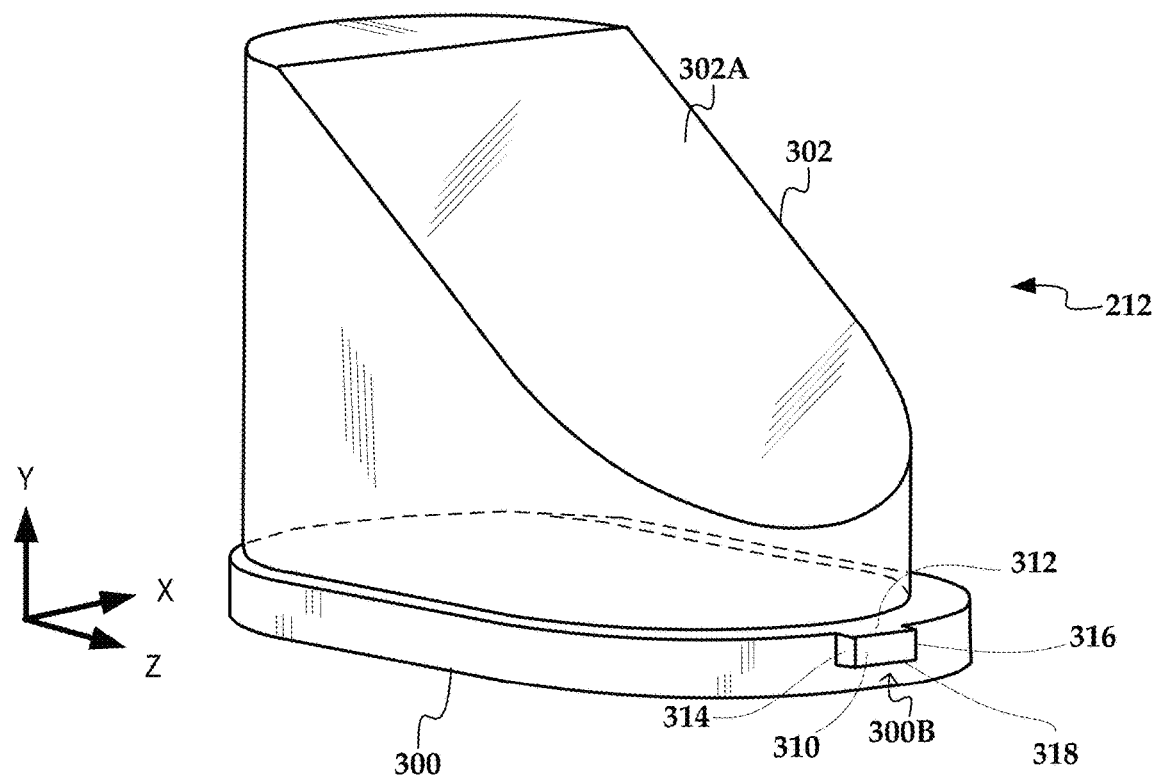
FIG. 5 is a perspective view of a near-field transducer according to an illustrative embodiment.

In FIG. 5, a perspective views show details of a device 212 including a NFT. The device 212 can include two parts: a disc 300 and a heat sink 302 proximate to (e.g., deposited directly on to) the disc 300. In this example, the outline of the disc 300 on the xz-plane (which is a substrate-parallel plane) is enlarged relative to the heat sink 302, although they may be the same size. The heat sink 302 can include an angled surface 302a that is located proximate to a write pole (see, e.g., write pole 206 in FIG. 2).

The disc 300 acts as a collector of optical energy from a waveguide and/or focusing element. The disc 300 achieves surface plasmon resonance in response to the optical energy and the surface plasmons are directed to the medium via a peg 300b that extends from the disc 300. It should be noted that the heat sink may also contribute to the energy transfer process and in some such embodiments a NFT does not necessarily include a separate disc and heat sink but a single component that can act as both. In this example, the disc 300 is configured as an elongated plate with rounded (e.g., circular) ends, also referred to as a stadium or capsule shape. Other enlarged portion geometries may be used, including circular, rectangular, triangular, etc.

Figure 6:
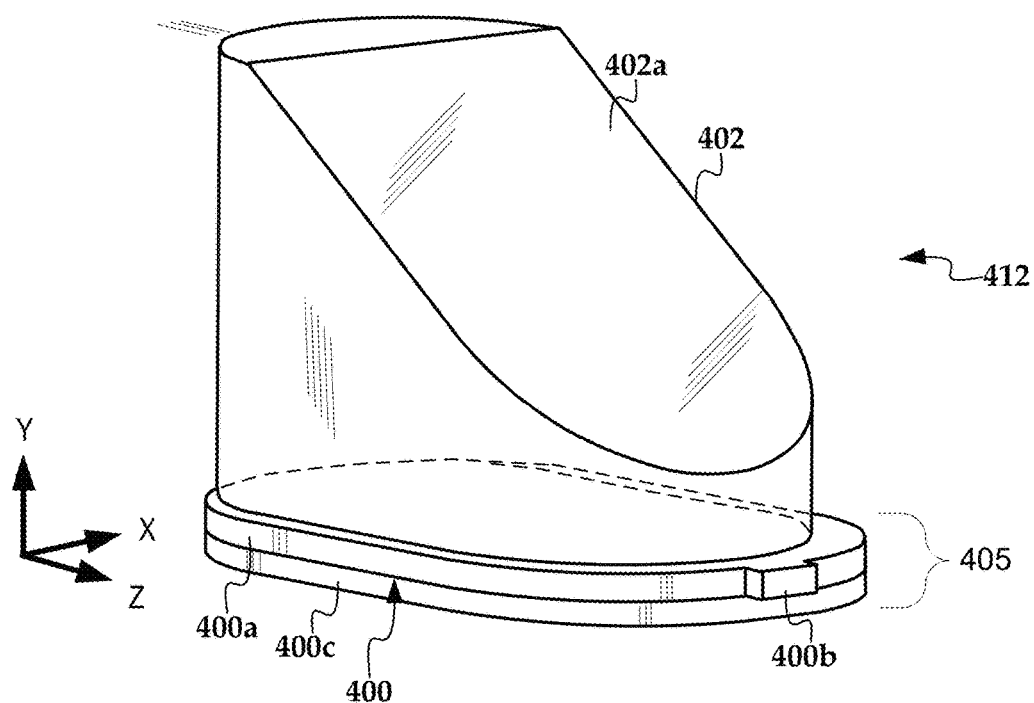
FIG. 6 is a perspective view of a near-field transducer according to an illustrative embodiment.

In FIG. 6, a perspective views show details of a device 412 according to an example embodiment. The device 412 includes a NFT 405 and a heat sink 402 proximate to (e.g., deposited directly on to) the disc 400 of the NFT 405. In this example, the outline of the disc 400 on the xz-plane (which is a substrate-parallel plane) is enlarged relative to the heat sink 402, although they may be the same size. The heat sink 402 includes an angled surface 402a that is located proximate to a write pole.

The disc 400 includes a top disc 400a that acts as a collector of optical energy from a waveguide and/or focusing element. The top disc 400a achieves surface plasmon resonance in response to the optical energy and the surface plasmons are directed to the medium via a peg 400b that extends from top portion 400a. In this example, the top portion 400a is configured as an elongated plate with rounded (e.g., circular) ends, also referred to as a stadium or capsule shape. Other enlarged portion geometries may be used, including circular, rectangular, triangular, etc.

The disc 400 also includes a bottom disc 400c. The bottom disc 400c can also be referred to as a sunken disc. The term "sunken disc" refers to a base or bottom portion that extends below the peg, as shown by the base portion 400c in FIG. 5. This can also be described as the peg extending beyond the bottom disc 400c. In some embodiments, such as that depicted in FIG. 6, the bottom disc 400c and the top disc 400a can have the same outline shape (e.g., stadium shape) as well as a same outline size. In some embodiments, the bottom disc 400c and the top disc 400a can have different outline shapes, different outline sizes, or combinations thereof. The peg 400b extends beyond the bottom disc 400c. The bottom portion 400c is disposed proximate a light delivery structure (e.g., a waveguide core) and away from a write pole. In some embodiments, the bottom disc 400c may likely be, but need not be, the primary collector of optical energy. NFTs such as those described in commonly assigned U.S. Pat. No. 9,721,593, the disclosure of which is incorporated herein by reference thereto can also be utilized with disclosed copper alloys.

In some embodiments, disclosed NFTs or a portion of a NFT include copper (Cu) alloys of the formula $Cu_{1-z}X_z$, where z ranges from 0.001 to 0.9 and X is selected from aluminum (Al), cobalt (Co), chromium (Cr), erbium (Er), iron (Fe), gold (Au), hafnium (Hf), iridium (Ir), molybdenum (Mo), nickel (Ni), palladium (Pd), platinum (Pt), rhenium (Re), rhodium (Rh), ruthenium (Ru), silicon (Si), tin (Sn), tantalum (Ta), tellurium (Te), titanium (Ti), tungsten (W), yttrium (Y), zinc (Zn), zirconium (Zr), or combinations thereof. In some embodiments, only a portion of a NFT can include disclosed copper alloys and in some embodiments, more than one portion of a NFT can include disclosed copper alloys. In some embodiments, z is not greater than 0.15, in some embodiments, not greater than 0.11, and in some embodiments not greater than 0.05. In some embodiments, z can range from z 0.015 to 0.1, and in some embodiments from 0.03 to 0.15 for example.

Some disclosed copper alloys are amorphous whereas other disclosed copper alloys are crystalline. The identity of X as well as the value of z can dictate whether an alloy is amorphous or crystalline. In some embodiments, copper alloys where X is zirconium (Zr), tantalum (Ta), hafnium (Hf), titanium (Ti), tellurium (Te), silicon (Si), or erbium (Er) may be amorphous depending on the value of z. Amorphous copper alloys may be advantageous because their glass transition temperatures are around or above 400° C., which may provide better thermal stability at the higher HAMR operating temperatures. In some embodiments, $Cu_{1-z}X_z$ alloys where z≥0.11 are amorphous, alloys were 0.04<z<0.11 are mixed phases of polycrystalline and amorphous and alloys where z≤0.04 are polycrystalline. As the amount of Zr increases, the hardness of the CuZr alloy increases but the plasmonic response decreases, therefore the amount of Zr included in a CuZr alloy can be considered a compromise between the hardness and plasmonic properties of the alloy. In some, specific illustrative embodiments CuZr alloys having from 1% to 4% (atomic percent) Zr are plasmonically better than rhodium (Rh) and much harder than gold (Au).

In some embodiments, disclosed NFTs can also include ternary copper (Cu) alloys of the formula $Cu_{1-z1-z2}A_{z1}D_{z2}$, where A is selected from aluminum (Al), gold (Au), palladium (Pd), platinum (Pt), chromium (Cr), tin (Sn) or titanium (Ti) and D is selected from tantalum (Ta), zinc (Zn), zirconium (Zr), cobalt (Co), iridium (Ir), nickel (Ni), ruthenium (Ru), tungsten (W), and yttrium (Y) for example. In some such embodiments, the A alloys can function to stabilize the copper against oxidation and the D alloys can function to increase the hardness and thermal stability of the copper. The sum of the A and D alloys, or the sum of z1 and z2 for example can range from 0.01 to 0.95 or from 0.01 to 0.9. Illustrative, specific ternary alloys can include, for example CuAlZr, CuAlY, CuAlZn, CuZnSn, CuAuPd, CuAlPdZr, CuAuPt, and CuCrZr.

While the present disclosure is not so limited, an appreciation of various aspects of the disclosure will be gained through a discussion of the examples provided below.

In some embodiments, disclosed NFTs can also include quaternary copper (Cu) alloys of the formula $Cu_{1-z1-z2-z3}A_{z1}D_{z2}E_{z3}$, where A, D and Z can be selected from aluminum (Al), gold (Au), palladium (Pd), platinum (Pt), chromium (Cr), tin (Sn), titanium (Ti), tantalum (Ta), zinc (Zn), zirconium (Zr), cobalt (Co), iridium (Ir), nickel (Ni), ruthenium (Ru), tungsten (W), yttrium (Y), others. The sum of the A, D and Z metals, or the sum of z1, z2 and z3 can range from 0.01 to 0.95, or from 0.01 to 0.9. Illustrative, specific ternary alloys can include, for example CuAlZnSn, CuAlNiZr, CuAlPdZr, and CuAuPdZr.

EXAMPLES

In order to better understand how disclosed copper alloys would effect NFT function, the refractive index (n) and the coefficient of extinction (k) were measured at 830 nanometers (nm) for some copper zirconium alloys as well as some benchmark materials. The results are shown in Table 1 below.

TABLE 1

| Material | n | K |
|---|---|---|
| Au | 0.25 | 5.47 |
| Rh | 2.85 | 7.11 |
| Ag | 0.19 | 5.33 |
| Cu | 0.23 | 5.42 |
| $Cu_{0.99}Zr_{0.01}$ (CZ1) | 0.44 | 5.38 |
| $Cu_{0.98}Zr_{0.02}$ (CZ2) | 0.54 | 5.27 |
| $Cu_{0.97}Zr_{0.03}$ | 0.91 | 5.35 |
| $Cu_{0.96}Zr_{0.04}$ (CZ4) | 1.13 | 5.38 |
| $Cu_{0.93}Zr_{0.07}$ (CZ7) | 1.72 | 5.2 |
| $Cu_{0.89}Zr_{0.11}$ (CZ11) | 2.28 | 4.77 |
| $Cu_{0.82}Zr_{0.18}$ | 2.62 | 4.34 |
| $Cu_{0.75}Zr_{0.25}$ (CZ25) | 2.53 | 4.14 |
| $Cu_{0.70}Zr_{0.30}$ | 2.54 | 4.05 |
| $Cu_{0.66}Zr_{0.34}$ | 2.88 | 4.23 |
| $Cu_{0.62}Zr_{0.38}$ | 3.19 | 4.34 |
| $Cu_{0.57}Zr_{0.43}$ | 3.27 | 4.32 |

Figure 7:
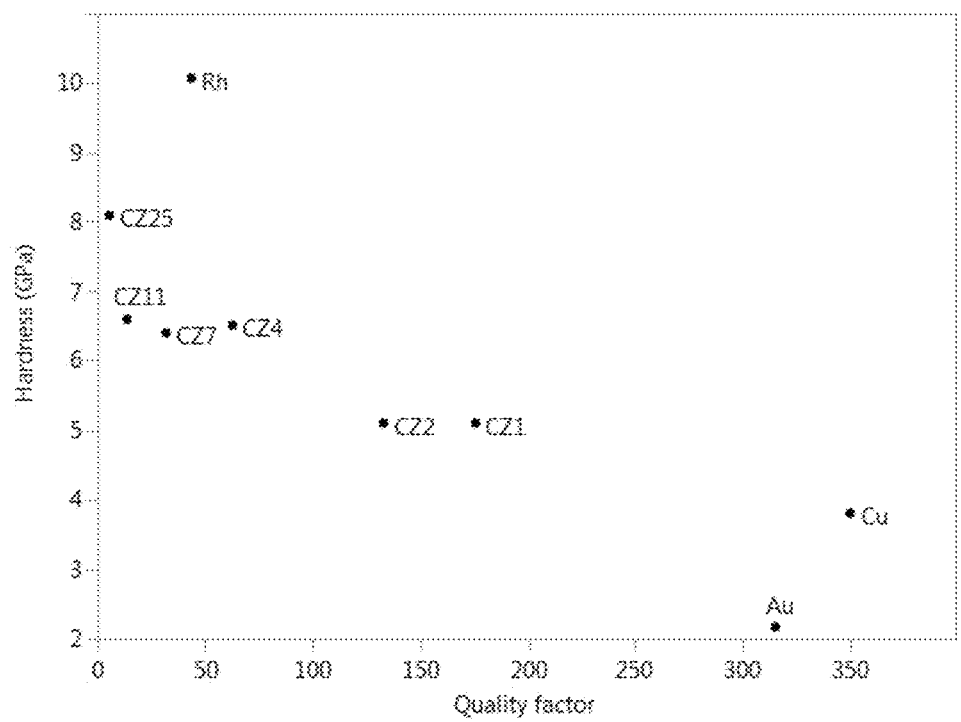
FIG. 7 is a plot of hardness (GPa) of some of copper alloys as a function of a quality factor related to the optical properties $(n^2-k^2)^2/2nk$.
Figure 8:
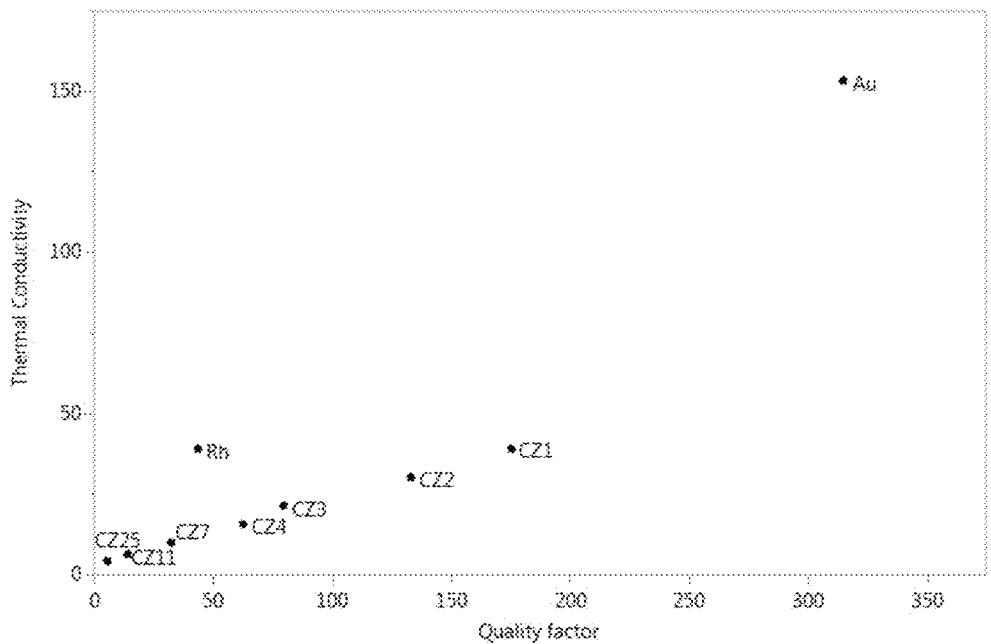
FIG. 8 is a plot of the thermal conductivity (W/mK) of some of copper zirconium alloys as a function of a quality factor related to the optical properties $(n^2-k^2)^2/2nk$.

The hardness (GPa) of some of the copper alloys were also measured and plotted as a function of a quality factor related to the optical properties $(n^2-k^2)^2/2nk$. The results of this are shown in FIG. 7. The thermal conductivity (W/mK) of some of the copper alloys were also measured and plotted as a function of a quality factor related to the optical properties $(n^2-k^2)^2/2nk$. The results of this are shown in FIG. 8.

The addition of optional seed layers under a disclosed copper alloy was also investigated. The results of this are seen in Table 2 below.

TABLE 2

| Material | n | k | Quality factor |
|---|---|---|---|
| $Cu_{0.99}Zr_{0.01}$ 45 nm | 0.438 | 5.383 | 175.602 |
| Zr0.5 nm/$Cu_{0.99}Zr_{0.01}$ 45 nm | 0.467 | 5.348 | 161.411 |
| Pt 0.5 nm/$Cu_{0.99}Zr_{0.01}$ 45 nm | 0.41 | 5.299 | 179.315 |
| Y 0.5 nm/$Cu_{0.99}Zr_{0.01}$ 45 nm | 0.409 | 5.33 | 182.747 |

In order to better understand how disclosed copper alloys would effect NFT function, the refractive index (n) and the coefficient of extinction (k) were measured at 830 nanometers (nm) for some copper tantalum alloys as well as some benchmark materials. The results are shown in Table 3 below.

TABLE 3

| Material | n | K |
| --- | --- | --- |
| Au | 0.25 | 5.47 |
| Rh | 2.85 | 7.11 |
| Ag | 0.19 | 5.33 |
| Cu | 0.23 | 5.42 |
| CuTa (1.5%) (CT1.5) | 0.66 | 5.37 |
| CuTa (2%) (CT2) | 0.81 | 5.47 |
| CuTa (3%) (CT3) | 1.03 | 5.46 |
| CuTa (4%) (CT4) | 1.31 | 5.37 |
| CuTa (7%) (CT7) | 1.74 | 5.26 |
| CuTa (10%) (CT10) | 1.98 | 5.11 |
| CuTa (20%) (CT20) | 2.38 | 4.65 |
| CuTa (30%) (CT30) | 2.77 | 4.34 |
| CuTa (50%) | 3.49 | 4.41 |
| CuTa (70%) | 3.65 | 4.61 |
| CuTa (85%) | 3.36 | 4.53 |

Figure 9:
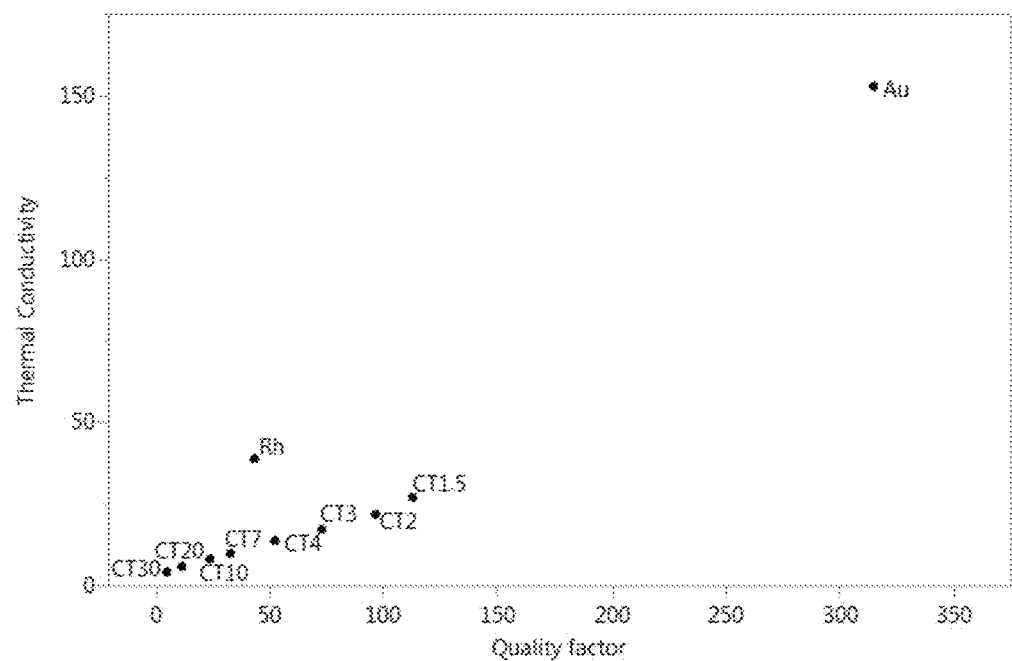
FIG. 9 is a plot of the thermal conductivity (W/mK) of some of copper tantalum alloys as a function of a quality factor related to the optical properties $(n^2-k^2)^2/2nk$.

The thermal conductivity (W/mK) of some of the copper alloys were also measured and plotted as a function of a quality factor related to the optical properties $(n^2-k^2)^2/2nk$. The results of this are shown in FIG. 9.

In order to better understand how disclosed copper alloys would effect NFT function, the refractive index (n) and the coefficient of extinction (k) were measured at 830 nanometers (nm) for some copper palladium alloys as well as some benchmark materials. The results are shown in Table 4 below.

TABLE 4

| Material | n | K |
| --- | --- | --- |
| Au | 0.25 | 5.47 |
| Rh | 2.85 | 7.11 |
| Ag | 0.19 | 5.33 |
| Cu | 0.23 | 5.42 |
| CuPd (3.3%) (CP3.3) | 0.25 | 5.18 |
| CuPd (4.5%) (CP4.5) | 0.31 | 5.17 |
| CuPd (5%) (CP5) | 0.34 | 5.14 |
| CuPd (7%) (CP7) | 0.46 | 5.05 |
| CuPd (10%) (CP10) | 0.65 | 4.91 |
| CuPd (15%) (CP15) | 0.98 | 4.68 |
| CuPd (30%) (CP30) | 1.97 | 4.32 |
| CuPd (50%) (CP50) | 2.47 | 4.38 |

Figure 10:
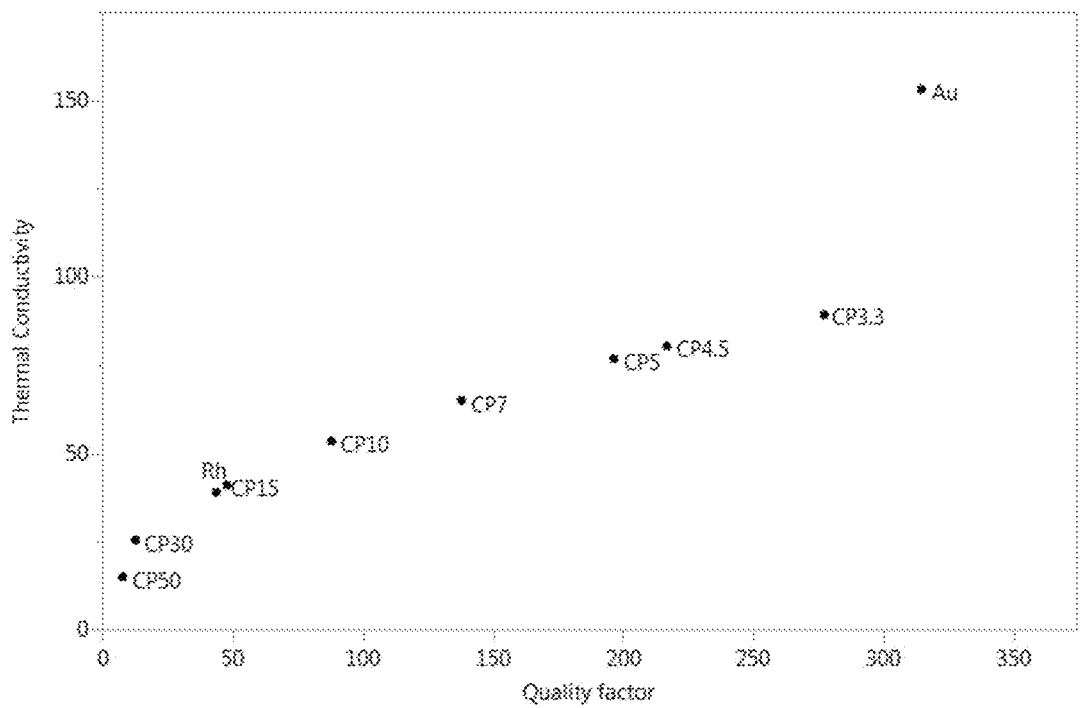
FIG. 10 is a plot of the thermal conductivity (W/mK) of some of copper palladium alloys as a function of a quality factor related to the optical properties $(n^2-k^2)^2/2nk$.

The thermal conductivity (W/mK) of some of the copper alloys were also measured and plotted as a function of a quality factor related to the optical properties $(n^2-k^2)^2/2nk$. The results of this are shown in FIG. 10.

All scientific and technical terms used herein have meanings commonly used in the art unless otherwise specified. The definitions provided herein are to facilitate understanding of certain terms used frequently herein and are not meant to limit the scope of the present disclosure.

As used in this specification and the appended claims, "top" and "bottom" (or other terms like "upper" and "lower") are utilized strictly for relative descriptions and do not imply any overall orientation of the article in which the described element is located.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise. The term "and/or" means one or all of the listed elements or a combination of any two or more of the listed elements.

As used herein, "have", "having", "include", "including", "comprise", "comprising" or the like are used in their open ended sense, and generally mean "including, but not limited to". It will be understood that "consisting essentially of", "consisting of", and the like are subsumed in "comprising" and the like. For example, a conductive trace that "comprises" silver may be a conductive trace that "consists of" silver or that "consists essentially of" silver.

As used herein, "consisting essentially of," as it relates to a composition, apparatus, system, method or the like, means that the components of the composition, apparatus, system, method or the like are limited to the enumerated components and any other components that do not materially affect the basic and novel characteristic(s) of the composition, apparatus, system, method or the like.

The words "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

Also herein, the recitations of numerical ranges by endpoints include all numbers subsumed within that range (e.g., 1 to 5 includes 1, 1.5, 2, 2.75, 3, 3.80, 4, 5, etc. or 10 or less includes 10, 9.4, 7.6, 5, 4.3, 2.9, 1.62, 0.3, etc.). Where a range of values is "up to" a particular value, that value is included within the range.

Use of "first," "second," etc. in the description above and the claims that follow is not intended to necessarily indicate that the enumerated number of objects are present. For example, a "second" substrate is merely intended to differentiate from another infusion device (such as a "first" substrate). Use of "first," "second," etc. in the description above and the claims that follow is also not necessarily intended to indicate that one comes earlier in time than the other.

Thus, embodiments of materials for near field transducers and near field transducers containing the same are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

The invention claimed is:

1. A device comprising:
a near field transducer, the near field transducer comprising a copper (Cu) alloy of the formula $Cu_{1-z}X_z$, where z ranges from 0.001 to 0.9 and
X is selected from aluminum (Al), erbium (Er), gold (Au), hafnium (Hf), molybdenum (Mo), nickel (Ni), rhenium (Re), ruthenium (Ru), silicon (Si), tin (Sn), tellurium (Te), titanium (Ti), tungsten (W), yttrium (Y), zinc (Zn), zirconium (Zr), or combinations thereof.

2. The device according to claim 1, wherein X is zirconium (Zr).

3. The device according to claim 2, wherein z is not greater than 0.15.

4. The device according to claim 2, wherein z is not greater than 0.11.

5. The device according to claim 2, wherein z is not greater than 0.05.

6. The device according to claim 1, wherein X is selected from zirconium (Zr), hafnium (Hf), titanium (Ti), tellurium (Te), silicon (Si), erbium (Er), or combinations thereof.

7. The device according to claim 1, wherein X is tantalum (Ta) and wherein z is 0.015 to 0.1.

8. The device according to claim 1, wherein X is palladium (Pd) and wherein z is 0.03 to 0.15.

9. A device comprising:
a near field transducer, the near field transducer comprising a copper (Cu) ternary alloy of the formula $Cu_{1-z1-z2}A_{z1}D_{z2}$, where A is selected from aluminum (Al), palladium (Pd), chromium (Cr), or titanium (Ti) and D is selected from tantalum (Ta), zirconium (Zr), cobalt (Co), iridium (Ir), nickel (Ni), ruthenium (Ru), tungsten (W), yttrium (Y), wherein the sum of z1 and z2 range from 0.001 to 0.95.

10. The device according to claim 9, wherein the ternary alloy is selected from: CuAlZr, CuAlY, CuAlZn, CuZnSn, CuAuPd, CuAlPd, CuAuPt, and CuCrZr.

11. A device comprising:
a light source;
a waveguide; and
a near field transducer, the near field transducer comprising a copper (Cu) alloy of the formula $Cu_{1-z}X_z$, where z ranges from 0.001 to 0.9 and
X is selected from aluminum (Al), erbium (Er), gold (Au), hafnium (Hf), molybdenum (Mo), nickel (Ni), rhenium (Re), ruthenium (Ru), silicon (Si), tin (Sn), tellurium (Te), titanium (Ti), tungsten (W), yttrium (Y), zinc (Zn), zirconium (Zr), or combinations thereof;
wherein the light source, waveguide and near field transducer are configured to transmit light from the light source to the waveguide and finally the near field transducer.

12. The device according to claim 11, wherein X is zirconium (Zr).

13. The device according to claim 12, wherein z is not greater than 0.15.

14. The device according to claim 12, wherein z is not greater than 0.11.

15. The device according to claim 12, wherein z is not greater than 0.05.

16. The device according to claim 11, wherein X is selected from zirconium (Zr), hafnium (Hf), titanium (Ti), tellurium (Te), silicon (Si), erbium (Er), or combinations thereof.

17. A system comprising:
a light source;
a near field transducer, the near field transducer copper (Cu) alloy of the formula $Cu_{1-z}X_z$, where z ranges from 0.001 to 0.9 and
X is selected from aluminum (Al), erbium (Er), gold (Au), hafnium (Hf), molybdenum (Mo), nickel (Ni), rhenium (Re), ruthenium (Ru), silicon (Si), tin (Sn), tellurium (Te), titanium (Ti), tungsten (W), yttrium (Y), zinc (Zn), zirconium (Zr), or combinations thereof;
a magnetic reader; and
a magnetic writer,
wherein the light source and the near field transducer are configured to transmit light from the light source to the near field transducer in order to assist the magnetic writer with writing.

18. The system according to claim 17, wherein X is zirconium (Zr) and z is not greater than 0.15.

* * * * *